Aug. 11, 1931. J. L. LYNCH 1,818,919
ANTISKID CHAIN
Filed Oct. 8, 1930
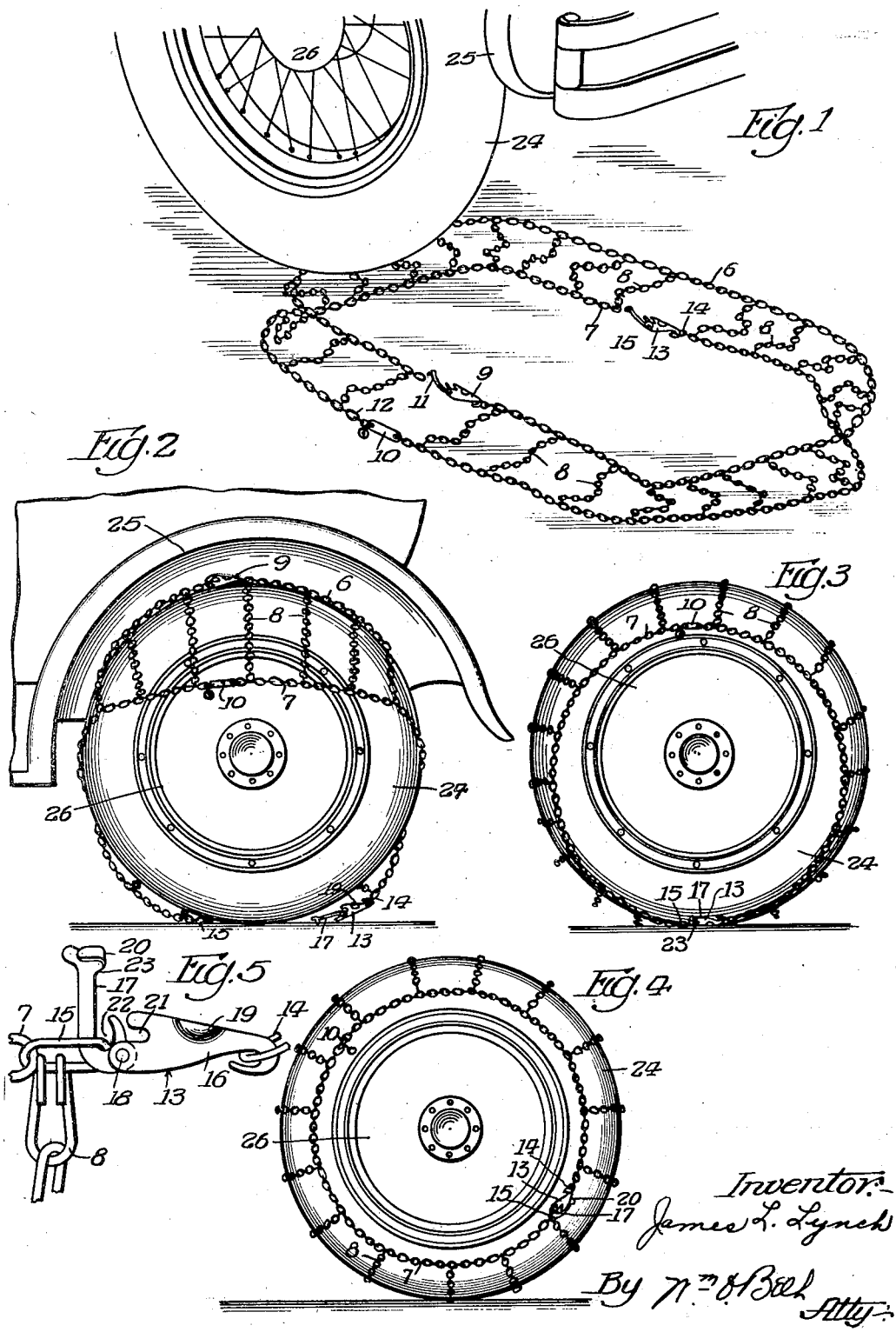

Patented Aug. 11, 1931

1,818,919

UNITED STATES PATENT OFFICE

JAMES L. LYNCH, OF MEDIA, ILLINOIS

ANTISKID CHAIN

Application filed October 8, 1930. Serial No. 487,129.

This invention relates to anti-skid chains of the type used on automotive tires and the like.

The salient objects of my invention are to provide a novel anti-skid chain which may be very expeditiously installed on a tire or removed therefrom; which may be readily adjusted to insure proper fitting thereof on the tire; and which will embody separable portions arranged in diametrical opposition on the peripheral portions of the chain.

In the selected embodiment of the invention, illustrated in the accompanying drawings, Fig. 1 is a perspective view showing the first step in the installation of my novel chain on the tire of an automotive vehicle;

Fig. 2 is a side elevation of the second step in the installation of the chain on a tire;

Fig. 3 is a side elevation of a third step in the installation of the chain on a tire;

Fig. 4 is a side elevation of the chain as finally installed on a tire; and

Fig. 5 is a detail view of a connector used on the chain.

Anti-skid chains of the type used prior to my invention commonly embodied two parallel chains which when arranged in position on a tire extended circumferentially therearound, and in addition to these chains a plurality of cross chains were provided which extended between the first two chains and over the periphery of the tire. It has been customary to provide suitable connector elements at corresponding ends of the circumferential chains, which connector elements serve to retain the chain on a tire but the installation of chains so arranged has been rather difficult, and I have found that by providing an additional connecting element in one of the circumferential chains that the installation or removal of an anti-skid chain from a tire may be greatly expediated. Thus, in the accompanying drawings I have shown an anti-skid chain comprising circumferential chains 6 and 7 and extending between these chains 6 and 7 as, for example, at uniformly spaced intervals, are cross chains 8. The chains 6, 7 and 8 may be made from a suitable wear-resistant metal and preferably these chains will be made from a hard, yet tough, metal so that the chain will be sufficiently hard to grip on ice or other similar hard surfaces to prevent skidding. At corresponding ends of the chains 6 and 7 connector elements 9 and 10 are provided, which connector elements may be of any approved form of construction. The connector elements 9 and 10 cooperate with the last links 11 and 12 at the opposite ends of the chains 6 and 7 and thus when the connector elements 9 and 10 are joined with the links 11 and 12 and when said connector elements are secured after the disposition of the chains about the tire, the chains 6 and 7 are continuously extending and are disposed to circumferentially extend about the tire. The chain, as thus far described, is common in the art, but I have found, as above stated, that it is rather difficult to install such chains on the tires. I therefore provide an additional connector element and I arrange this additional connector element in the chain 7 which is the chain intended to be disposed toward the outer side of the wheel when the anti-skid chain is arranged thereon. This additional connector element, indicated by 13, is disposed substantially in diametrical opposition to the connector element 10 in the chain 7 but the connector 13 need not be disposed in strict diametrical opposition, as I have found that satisfactory results can be attained if the connector 13 is positioned not less than 90° from the connector 10 nor more than 270° from said connector when the chain 7 is arranged in circumferential position on a tire. The connector element 13 supplants a few links in the chain 7 and one end of the connector 13 is permanently connected to the link 14 in the chain 7 whereas the opposite end of the link is arranged for detachable connection with the link 15 in the chain 7. The connector 13 includes a main body portion 16, and the link 14 is connected to this main body portion at one end thereof, while an arm 17 is pivotally connected at 18 to the other end of the main body portion. A protuberance 19 is provided on the main body portion 16 and cooperates with a yieldable latch portion 20 at the outer end of the arm 17 so that when the arm 17 is arranged to extend over the main body portion 16, in substantially parallel relation therewith, the yieldable portion 20 will engage the protuberance 19 and prevent displacement of the arm 17. In the main body portion 16, adjacent the pivotal connection 18 there is a recess 21 and on the arm 17 there is a hook portion 22, and when the arm 17 is arranged in the parallel relation, above referred to, the link 15 is disposed in the hook portion 22 and the recess 21 and is held from displacement by the arm 17. A shoulder 23 is provided on the arm 17 adjacent the yieldable portion 20, the utility of which will be made apparent presently. In the preferred use of my invention the connector 10 in the chain 7 is permanently arranged in securing position, this connector being provided to afford an adjustment in order that said connector may be joined to a link farther along the chain than the link 12, it also being the intention to similarly join the connecting element 9 to a link farther along the chain 6 than the link 11, this adjustment being provided to insure a neat fit of the chain on the tire. However, after the proper adjustment has been ascertained the connector 10 is, as above stated, arranged in closed position and, if desired, suitable means may be provided for securely fastening the connector 10 so as to prevent opening thereof. While the provision of the connector 10 is advantageous, it will be apparent from the following description that this connector might be eliminated and the connectors 9 and 13 might be the only ones provided, as such an arrangement would permit satisfactory use of my device. Inasmuch as the connectors 9 and 10 are arranged in similar positions in the chains 6 and 7 and as the connector 13 is arranged in substantially diametrical opposition to the connector 10 and as the connector 10 is permanently connected it is manifest that separable connections are provided in the chains 6 and 7 and that these separable connections are arranged in diametrical opposition.

In installing the anti-skid chain on a tire, such as that indicated by 24, the chain is disposed behind the tire with the porton of the chain adjacent the connector 13 resting on the surface supporting the tire 24 in order that said tire may be moved rearwardly and stopped in a position in alignment with the connector 13. After this has been done the chain is lifted around the tire 24 and is disposed in a position substantially similar to that shown in Fig. 2 and the connector 9 is closed while the chain 6 is arranged substantially on the crown of the tire 24 for sufficient clearance is provided between the usual fender 25 and the tire to permit this connection. After the connector 9 has been arranged in fastening position the portion of the chain disposed at the upper portion of the tire is fitted therearound in operating position, that is, the chains 6 and 7 are equidistantly spaced from the crown of the tire on opposite sides thereof. When the chain has been so arranged, the link 15 is disposed in engagement with the shoulder 23, and this is clearly shown in Fig. 3. The wheel 26 carrying the tire 24 is then turned to dispose the connector 13 in a position slightly remote from the lower portion of the tire, as shown in Fig. 4, and the arm is pivoted into substantially parallel relation with the body portion 16, said arm being of sufficient length to provide leverage to facilitate this movement, and when the yieldable portion 20 engages the protuberance 19 displacement of the arm 17 will be prevented and the anti-skid chain will be securely fastened on the tire 24.

When it is desired to remove the anti-skid chain from the tire 24, the wheel 26 will be arranged substantially in the position shown in Fig. 4, after which the connector 13 may be unlatched and then the chain may be moved sufficiently to afford access to the connector 9 which will be unlatched and after this the chain may be readily removed from the tire 24.

It is manifest that by providing the additional connector in the outwardly disposed chain in a circumferential position not less than 90° away from the connector in the inwardly disposed chain and not more than 270° from this connector, expeditious installation and removal of the anti-skid chain on a tire may be brought about. Further, by providing a connector embodying a pivotal arm of a length to provide sufficient leverage to facilitate tightening of the chain, the foregoing arrangement is greatly expedited.

While I have illustrated and described a selected embodiment of my invention, it is to be understood that this is capable of variation and modification and I therefore do not wish to be limited to the precise details set forth but desire to avail myself of such changes and alterations as fall within the purview of the following claim.

I claim:

An anti-skid chain comprising two circumferential chains of substantially equal length and a plurality of cross chains extended therebetween, connector elements at corresponding points in said chains and another connector element in one of said side chains spaced not less than one-fourth the length of the chains and not more than three-fourths the length of the chains from the first-mentioned connecting elements in said chains, said last-named connecting element comprising a main body portion, an arm pivotally mounted at one end of said main body portion and including a hook portion into which an end of said chain may be fitted when said arm is moved away from said main body portion, said main body portion having a recess therein into which the end of said chain may be moved when said arm is moved into parallel relation with said main body portion, and means for retaining said arm in parallel relation with said main body porton.

JAMES L. LYNCH.